United States Patent [19]

Treiber et al.

[11] Patent Number: 4,469,291

[45] Date of Patent: Sep. 4, 1984

[54] APPARATUS FOR INTRODUCING STRIP-SHAPED MATERIAL INTO CASSETTES OR THE LIKE

[75] Inventors: Helmut Treiber; Christian Götze, both of Munich; Günter Lammel, Eching, all of Fed. Rep. of Germany

[73] Assignee: Agfa-Gevaert Aktiengesellschaft, Leverkusen, Fed. Rep. of Germany

[21] Appl. No.: 418,090

[22] Filed: Sep. 14, 1982

[30] Foreign Application Priority Data

Dec. 30, 1981 [DE] Fed. Rep. of Germany ....... 3151932

[51] Int. Cl.$^3$ .......................... G03B 1/04; G11B 15/32
[52] U.S. Cl. ..................................... 242/191; 226/118; 242/208
[58] Field of Search ................... 242/67.2, 67.5, 75.51, 242/187, 191, 206–210; 226/108, 118, 178, 188; 355/14 TR, 14 SH; 318/6, 7, 309–313, 326, 329

[56] References Cited

U.S. PATENT DOCUMENTS 3,196,421 7/1965 Grace et al. ..................... 318/309 X
3,800,196 3/1974 Zimmerman ............................ 318/6
4,401,923 8/1983 O'Gwynn ............................... 318/6

FOREIGN PATENT DOCUMENTS

2445259 4/1976 Fed. Rep. of Germany .
2617233 11/1977 Fed. Rep. of Germany .

Primary Examiner—Leonard D. Christian
Attorney, Agent, or Firm—Peter K. Kontler

[57] ABSTRACT

A copying machine admits a web of freshly exposed photographic paper directly into a cassette whose core engages and convolutes the web therearound. The progress of engagement between the leader of the web and the core is monitored by comparing the peripheral speed of the core with the peripheral speed of a rotor forming part of an advancing roll for the web and receiving torque from a variable-speed motor which also drives the core. The peripheral speed of the rotor increases when the leader of the web is adequately attached to the core, and this is detected by a circuit having first and second photoelectronic monitoring devices which respectively monitor the peripheral speeds of the rotor and the core. The signals which are generated by the monitoring devices are processed, and the processed signals are used to change the speed of the variable-speed motor, to deactivate a catcher mechanism which directs the leader of the web toward the core and assists in the establishment of adequate engagement between the leader and the core, to change the supply of energy to the motor as the diameter of convoluted web on the core increases, and/or to actuate an alarm device when the completion of attachment of the leader to the core is unduly delayed.

19 Claims, 6 Drawing Figures

APPARATUS FOR INTRODUCING STRIP-SHAPED MATERIAL INTO CASSETTES OR THE LIKE

CROSS-REFERENCE TO RELATED CASE

Figure 1:
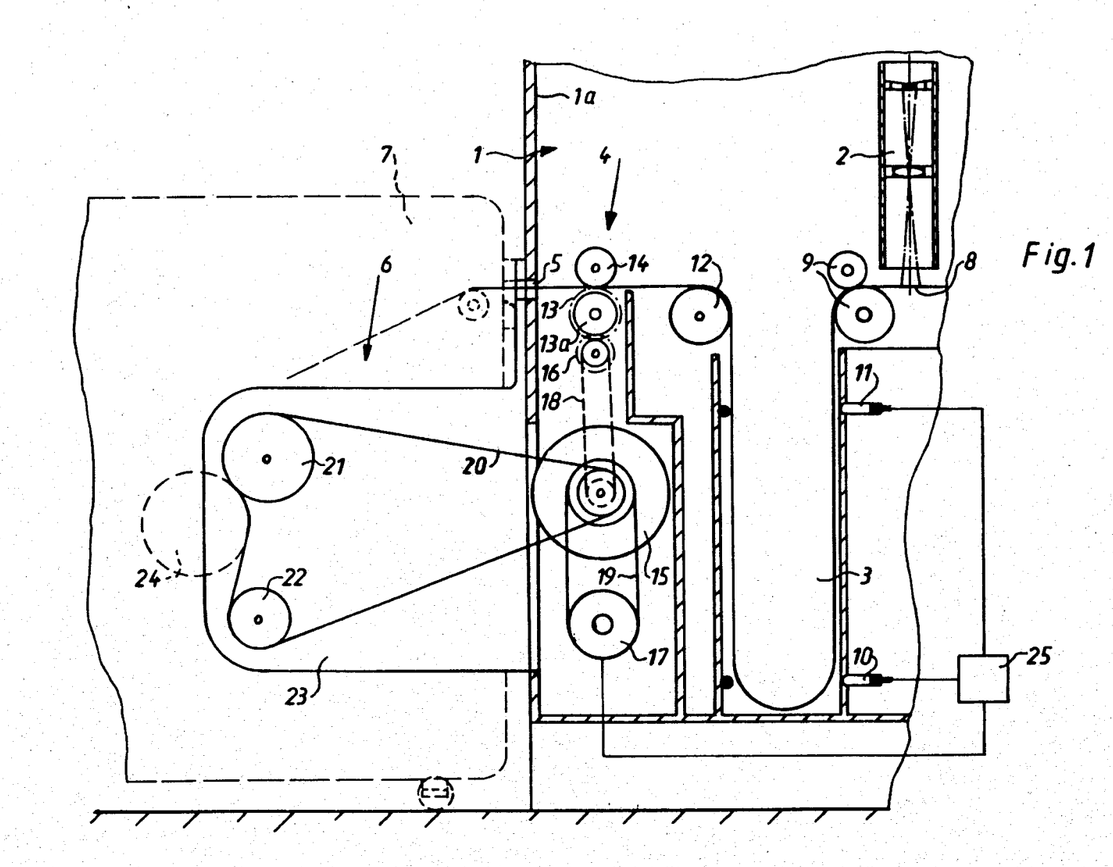
FIG. 1 is a fragmentary schematic vertical sectional view of a copying machine and a fragmentary elevational view of a cassette (the cassette is indicated by broken lines) which cooperates with the copying machine in accordance with the present invention.
Figure 2:
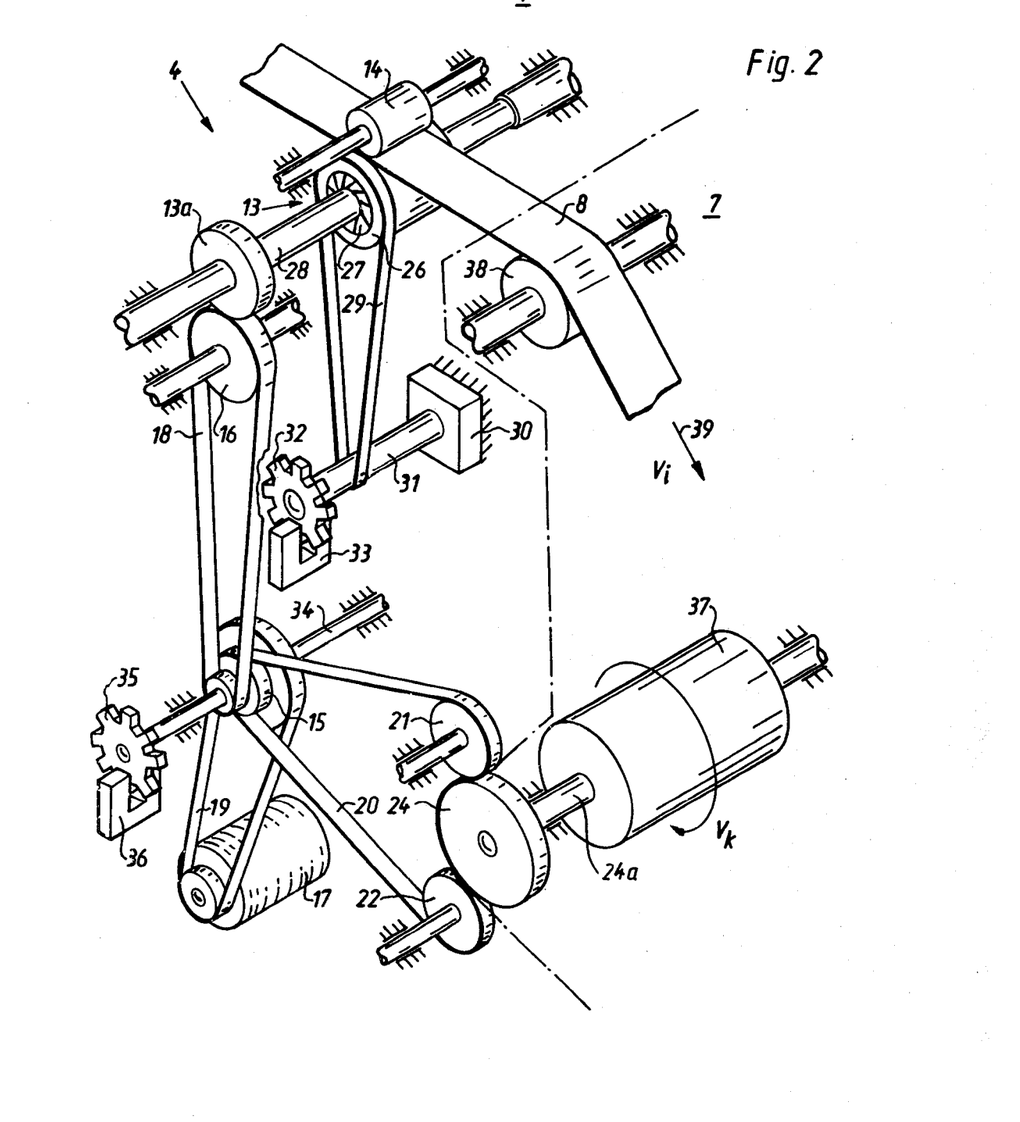
FIG. 2 is a perspective view of the driving unit for the material to be convoluted and for the core of the cassette.
Figure 2A:
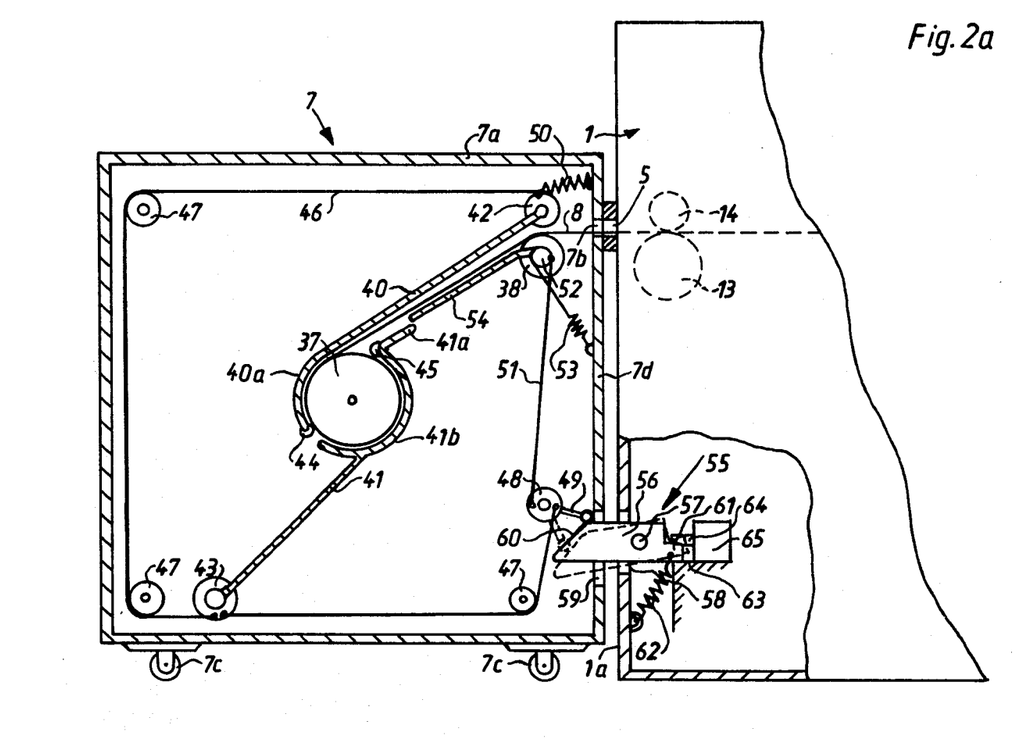
FIG. 2a is a vertical sectional view of the cassette and a fragmentary partly elevational and partly vertical sectional view of the copying machine.

The structure shown in FIGS. 1, 2 and 2a of the present application is identical with that which is shown in FIGS. 1 to 3 of the commonly owned copending application Ser. No. 417,889 filed Sept. 14, 1982 by Erich Nagel et al. for "Apparatus for introducing strip-shaped material into cassettes or the like".

BACKGROUND OF THE INVENTION

The present invention relates to apparatus for transporting strips, webs, tapes, bands or like flexible materials, especially for transporting webs of photosensitive material in and from the housing of a copying machine such as a photographic roll copier. More particularly, the invention relates to improvements in apparatus for transporting webs of freshly exposed photosensitive material from a copying machine into a cassette or another suitable receptacle which is held in a predetermined position with reference to the copying machine.

It is already known to equip a copying machine with an apparatus which can supply a web of photosensitive material into a cassette so that the leader of the web can be at attached to the rotary core of the cassette to be thereupon convoluted around the core in order to form a reel of desired diameter. The apparatus comprises a first advancing unit which is installed in the housing of the copying machine to transport the web from the copying machine toward the core of a cassette, and a second advancing unit which rotates the core to thus ensure that the core can wind the web therearound. Reference may be had to German Offenlegungsschrift No. 26 17 233 which discloses a copying machine with two advancing rolls serving to move the web of photosensitive material lengthwise toward and through an opening in the housing of the copying machine and thereupon through an opening of the casing forming part of a properly positioned cassette so that the leader of the web can reach the core in the interior of the cassette. The core of the properly positioned cassette is driven by the motor which transmits torque to the advancing rolls. The cassette contains a so-called catcher mechanism which steers the leader of the web toward and into engagement with the core so that the leader is convoluted around the core and its innermost convolution engages the peripheral surface of the core with a force which suffices to ensure that the core can draw the web from the interior of the copying machine. At such time, the catcher mechanism should be deactivated in order to avoid interference with accumulation of windings on the core.

As a rule, the leader of the web is advanced into the interior of an empty cassette while the copying machine is operated at the lower or lowest of two or more different speeds. The speed of the copying machine is, should or can be increased as soon as the leader is adequately attached to the core of the cassette.

A drawback of heretofore known apparatus is that proper attachment of the leader of a web to the core of the cassette cannot be recognized or detected with a requisite degree of reliability. For example, the aforementioned Offenlegungsschrift proposes to employ a mechanical detector which is supposed to monitor the progress of engagement between the leader of the web and the core of the cassette and to initiate a deactivation of the catcher mechanism when the attachment is completed. It has been found that the mechanical detector of the aforediscussed prior publication is not only unreliable but also bulky and highly prone to malfunction. Such mechanical detector is incapable of unequivocally ascertaining the exact moment when the web is adequately attached to the core so that the latter can draw the web from the housing of the copying machine. Therefore, the catcher mechanism is likely to be deactivated too soon or too late. If the deactivation is premature, the entire threading operation must be repeated or the leader must be attached to the core by hand. If the deactivation is unduly delayed, parts of the catcher mechanism are likely to damage the web.

OBJECTS AND SUMMARY OF THE INVENTION

An object of the invention is to provide a novel and improved apparatus which can reliably ascertain the exact instant of adequate attachment of the leader of a running web to a rotary component in the interior of a cassette or another receptacle for flexible photosensitive or like material.

Another object of the invention is to provide an apparatus which is simpler and more compact than heretofore known apparatus, and which can be installed in or associated with existing copying machines as a superior substitute for heretofore known apparatus.

A further object of the invention is to provide a novel and improved method of monitoring the progress of engagement between the leader of a flexible web and the rotary component in a receptacle wherein the web is to be stored by being convoluted onto such rotary component.

An additional object of the invention is to provide an apparatus which can automatically ascertain the completion of attachment of the leader of a running web to a rotary core or the like, and which can automatically trigger several operations as a result of automatic detection of establishment of an adequate connection between the web and the core.

An additional object of the invention is to provide novel and improved means for generating and processing signals which are indicative of the progress of establishment of a connection between the leader of a running web and the core of a cassette or the like Another object of the invention is to provide the apparatus with novel and improved means for influencing, in a number of different ways, the motor which drives the core of a cassette and the web advancing mechanism in a copying machine.

The invention resides in the provision of an apparatus for transporting a web of flexible material, particularly for transporting a web of photosensitive material from a copying machine into a receptacle which stores the web in the form of convolutions. The apparatus comprises first web advancing means (e.g., two advancing rolls defining a nip for the passage of the web therethrough) including a web-contacting first rotary component (this component can constitute a rotor which is mounted on a shaft with the interposition of a freewheel between the rotor and the shaft), second web advancing means including a second rotary component (this component can constitute the rotary core in the casing of a cassette or an analogous receptacle for a supply of flexible material), motor means for driving the first and second rotary components, freewheel means interposed between the motor means and the first component so that the first component can be rotated by the motor means to advance the web and by the web when the latter is advanced by the second advancing means and the peripheral speed of the second component exceeds a given peripheral speed at which the first rotary component can be driven by the motor means, first and second monitoring means for respectively monitoring the peripheral speeds of the first and second rotary components, and means for generating signals when the ratio of monitored peripheral speeds of the first and second rotary components is outside of a predetermined range.

If the apparatus serves to transport the web into a receptacle having a rotary core which constitutes the second rotary component and whose peripheral speed exceeds the aforementioned given speed while the second component is driven by the motor means, the web imparts torque to the first rotary component as soon as the leader of the web engages with and the web is drawn by the core. The peripheral speed of the first component then rises above the given value and at least approximates the speed of the second component. In such apparatus, the signal generating means (e.g., an up/down counter) can be designed to generate signals when the speed of the first component at least approximates the speed of the second component.

As mentioned above, the first advancing means can include two advancing rolls and the first rotary component can be a constituent of one of the advancing rolls. At least one of the monitoring means can comprise a star wheel or another slotted rotary member which rotates in synchronism with the respective rotary component and cooperates with a photocell whose transducer transmits signals at a frequency that is indicative of the peripheral speed of the respective rotary component.

The first and second monitoring means are preferably arranged to transmit second and third signals (such signals can be transmitted by the transducers of photocells forming part of the respective monitoring means) at frequencies which are indicative of the peripheral speeds of the respective rotary components. As mentioned above, the signal generating means can comprise an up/down counter having first and second inputs which are respectively connected with the first and second monitoring means. The counter is arranged to totalize the second or third signals, to subtract from the total the third or second signals, and to generate a first signal as already mentioned when the total of second or third signals minus the third or second signals matches a preselected value denoting that the engagement between the leader of the web and the second rotary component is complete. The means for receiving signals from the output of the counter can constitute a flip-flop which changes its condition in response to reception of a signal from the counter to thereby change the speed of the prime mover of the copying machine and/or to deactivate a catcher mechanism which is activated during attachment of the leader of the web to the second rotary component.

The apparatus can further comprise a second counter which counts the number of second signals and serves to activate an alarm device or the like when the number of second signals reaches a given value, namely, a number which is indicative that attachment of the leader to the second rotary component does not progress in the anticipated manner. The attendant or attendants then inspect the operation of the apparatus and undertake the necessary remedial steps. The second counter can be reset to zero by a signal from the aforementioned flip-flop so that it does not activate the alarm device if the up/down counter transmits a signal in time, i.e., within an anticipated interval of time after start of the web threading and attaching operation.

The motor means can include or constitute a variable speed electric motor, and the apparatus can further comprise means for influencing the motor when the difference between the peripheral speeds of the two rotary components reaches a predetermined value, e.g., while the diameter of the reel of convoluted web on the second rotary component increases and the web tends to transmit to the first component an excessive or insufficient torque. The influencing means can comprise a differential amplifier or another suitable signal comparing stage which processes the second and third signals and transmits a fourth signal denoting the difference between the two peripheral speeds to a memory which is interposed between such amplifier and the means for regulating the operation of the motor, e.g., for regulating the supply of electrical energy to the motor and for thereby changing the torque which the motor transmits to the parts receiving motion therefrom. The regulating means can comprise an operational amplifier which is connected with the differential amplifier via the memory which stores the last fourth signal from the differential amplifier. The regulating means can further comprise means for ascertaining the actual rate of supply of electrical energy to the motor and for transmitting corresponding signals to the operational amplifier.

In accordance with a further feature of the invention, the second signals can be used to regulate the speed of the motor means. To this end, a signal comparing stage in the form of an amplifier or the like receives signals from the first monitoring means and from a source of reference signals denoting the desired (preferably constant) peripheral speed of the first rotary component (i.e., the desired speed at which the web is to be drawn from the copying machine). The amplifier transmits a signal to a motor control circuit when the monitored peripheral speed of the first rotary component deviates from the desired rotary speed, and the control circuit then changes the speed of the motor so that the motor speed matches or approximates the speed which is denoted by the reference signal.

It will be noted that the first and second monitoring means can together influence the speed of the prime mover of the copying machine, the supply of electrical energy to the motor which drives the two rotary components, and the condition of the catcher mechanism. In addition, the first monitoring means can influence the speed of the motor for the two rotary components as well as the operation of the alarm device.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Referring to FIG. 1, there is shown a portion of a copying machine 1 including a copying station 2, a magazine 3 for storage of a loop of a web 8 of photographic paper, a transporting unit 4 for the web 8, a wall 1a with an opening 5 where the web 8 issues from the copying machine, and a web driving or advancing unit 6 for the rotary component or core 37 (FIGS. 2 and 2a) of a receptacle here shown as a cassette 7 for reception and storage of convoluted photographic paper.

The heretofore described parts of the copying machine 1 operate in the customary way, i.e., the web 8 is exposed at the station 2 and thereupon passes between two deflecting rolls 9 to enter the magazine 3. The quantity of flexible material which is stored in the magazine 3 is monitored by a lower photocell 10, which generates a signal when the magazine 3 is filled or substantially filled, and an upper photocell 11 which generates a signal when the quantity of stored photosensitive material has been reduced to a minimum acceptable value. The web 8 thereupon advances over a further deflecting roll 12 and through the nip of two advancing rolls 13 and 14 (forming part of the transporting unit 4 and constituting a first web advancing unit) on its way into and through the opening 5 in the wall 1a. The lower advancing roll 13 constitutes a rotary element of a condition changing means and is driven by a variable-speed motor 17 through the medium of pulleys 15, 16 and endless belts 18, 19. The pulley 15 further drives an endless belt 20 which forms part of the driving unit 6; the latter further comprises two pulleys 21, 22 over which the belt 20 is trained. The pulleys 21 and 22 are mounted on a plate-like support 23 which is disposed outside of the housing of the copying machine 1 and is adjacent to a cassette 7 when the latter is properly positioned and oriented with reference to the copying machine 1. The cassette 7 has an externally mounted torque-receiving wheel 24 which is engaged by the belt 20 in the region between the pulleys 21 and 22 when the cassette 7 is moved to a predetermined position which is shown in FIG. 1. The wheel 24 can transmit torque to the core 37 of the cassette 7 so that such core is rotated by the motor 17 when the motor is on and the belt 20 is in satisfactory frictional engagement with the wheel 24.

The parts 6, 24 and 37 (plus a shaft 24a which is shown in FIG. 2 and carries the wheel 24 as well as the core 37) can be said to constitute a second web advancing unit having a rotary web engaging component 37.

The signal generating transducers of the photocells 10 and 11 are connected with the corresponding inputs of an on-off circuit 25 which is designed to start the motor 17 when the looped web 8 in the magazine 3 extends all the way down between the light source and the transducer of the lower photocell 10, and which arrests the motor 17 when the quantity of photosensitive material in the magazine 3 is depleted to such an extent that the light source of the upper photocell 11 can transmit light to the associated transducer.

The transporting unit 4 is shown in greater detail in FIG. 2 which further illustrates several elements of the structure shown in FIG. 1. The lower advancing roll 13 comprises a web-contacting rotary component in the form of a hollow cylindrical rotor 26 whose internal surface is fixedly connected to the outer race of a bearing 27 constituting a freewheel and permitting the rotor 26 to rotate (in a clockwise direction, as viewed in FIG. 2) with reference to a motor-driven member or shaft 28 which is connected with the inner race of the freewheel 27. The latter can be of any conventional design, e.g., it can comprise a set of sprags which are installed between the inner and outer races. The inner race of the freewheel 27 is rigid with the shaft 28 which is journalled in the sidewalls of the copying machine 1 and carries a friction disc 13a which is staggered with reference to the rotor 26, as considered in the axial direction of the shaft 28. The wheel 13a is in frictional engagement with the external surface of the endless belt 18 which is trained over the pulleys 15 and 16.

A further endless belt 29 is trained over the rotor 26 of the advancing roll 13 in such a way that it is adjacent to the path of movement of the web 8 toward the opening 5 in the wall 1a of the copying machine 1. The purpose of the belt 29 is to drive the shaft 31 of a hysteresis brake 30. The shaft 31 carries a slotted rotary member or star wheel 32 which cooperates with a photocell 33 so that the number of signals which are transmitted by the transducer of the photocell 33 per unit of time is a function of the RPM of the shaft 31 and hence a function of the peripheral speed of the rotor 26.

The hysteresis brake 30 acts upon the rotor 26, either continuously or for short intervals of time, so as to oppose rotation of the rotor 26 in a clockwise direction, as viewed in FIG. 2, and to thereby ensure that the web 8 is tightly convoluted on the core 37 in the cassette 7. The construction and mode of operation of a hysteresis brake which can be used in the apparatus of the present invention are disclosed, for example, in German Pat. No. 24 45 259 which corresponds to U.S. Pat. No. 4,025,005. The disclosure of U.S. Pat. No. 4,025,005 is incorporated herein by reference.

The pulley 15 is a composite body with several sections having different diameters. This pulley is connected to a shaft 34 which is rotatable in the housing of the copying machine 1 and carries a slotted rotary member or star wheel 35 cooperating with a photocell 36 to generate signals denoting the speed of the motor 17 and the peripheral speed of the core 37. A smallest-diameter section of the pulley 15 drives the pulley 16 through the medium of the belt 18; a median-diameter section of the pulley 15 drives the belt 20 for the wheel 24 on the shaft of the core 37; and a maximum-diameter section of the pulley 15 receives torque from the motor 17 through the medium of the belt 19. The core 37 serves to convolute the web 8 therearound; to this end, the leader of the web 8 must be engaged by the core with assistance from a catcher mechanism the details of which are shown in FIG. 2a and whose purpose is to ensure that the leader of the web 8 is coiled about the core 37 until the frictional engagement between the material of the web and the core suffices to ensure that the core can draw the web into the cassette 7 when it receives torque from the motor 17 via belt 19, pulley 15, belt 20, wheel 24 and shaft 24a.

Successive increments of the web 8 which enter the cassette 7 travel over a guide roll 38 in the direction which is indicated by the arrow 39. Once the innermost convolution of the web 8 adequately adheres to the peripheral surface of the core 37, the aforementioned catcher mechanism is deactivated so that there is ample room for winding of a substantial quantity of photosensitive material onto the core 37. As a rule, a catcher mechanism comprises several mobile members in the form of arms which are moved close to the core 37 during guidance of the leader of the web 8 and which are retracted from the core 37 as soon as the latter is capable of reliably drawing successive increments of the web 8 from the interior of the housing of the copying machine 1, through the opening 5, and into the interior of the cassette 7.

Some or all of the belts shown in FIG. 2 can constitute toothed belts, and the associated pulleys are then provided with external teeth.

Referring to FIG. 2a, the receptacle or cassette 7 which is shown therein comprises a casing 7a confining the core 37 and the guide roll 38 and having an opening 7b movable into register with the opening 5 of the housing of the copying machine 1. The casing 7a is mounted on wheels 7c so that it can be readily manipulated to assume an optimum (predetermined) position for cooperation with the copying machine 1, i.e., for reception of a substantial supply of web 8 which is stored therein by being convoluted onto the core 37.

The casing 7a further accommodates the aforediscussed catcher mechanism one embodiment of which is shown in FIG. 2a. The illustrated catcher mechanism comprises two movable material confining and guiding members or arms 40 and 41 which are respectively secured to and pivotable by discrete wheels 42 and 43 mounted in two corner regions of the casing 7a which are disposed diagonally opposite one another. The arm 40 has an arcuate inner portion 40a which can surround approximately onefourth of the core 37 when the arm 40 assumes the operative position of FIG. 2a. The other arm 41 includes a substantially semicylindrical inner portion or shell 41b which can surround approximately one-half of the core 37 when the arm 41 assumes the operative position of FIG. 2a. The portions 40a and 41b of the arms 40 and 41 respectively carry small-diameter rollers 44 and 45 which can contact the peripheral surface of the core 37 to ensure that the arcuate portions 40a and 41b are held at a predetermined distance from the periphery of the core when the catching operation begins, i.e., when the leader of the web 8 begins to advance toward and to coil itself around the core 37. The arm 41 further comprises a straight extension 41a which bounds a portion of the underside of an elongated channel wherein the leader of the web 8 advances toward the core 37 when the arms 40 and 41 of the catcher mechanism assume the operative positions of FIG. 2a. The remainder of the guide channel is defined by the major portion of the arm 40 which bounds the channel from above, and by a third arm 54 connected to and pivotable by a roll 52 which is coaxial with the guide roll 38. The guide roll 38 and the wheel 42 flank the inlet of the channel; they are rather closely adjacent to the opening 7b in the casing 7a of the cassette 7.

The means for pivoting the arms 40, 41 of the catcher mechanism between the illustrated (operative) and second (inoperative) positions comprises an elongated flexible element 46 (hereinafter called cable) one end portion of which is affixed to the periphery of the wheel 42 for the arm 40. The cable 46 is trained over guide rolls 47 in the interior of the casing 7a, and an intermediate portion of the cable 46 is affixed to the periphery of the wheel 43 for the arm 41 while the other end portion of the cable 46 is affixed to the periphery of a further wheel 48 in the casing 7a. The guide rolls 47 are mounted in three corners of the casing 7a, and the wheel 48 is installed in rather close proximity to that end wall (7d) of the casing 7a which is adjacent to the copying machine 1 when the cassette 7 assumes the predetermined web-receiving position of FIG. 2a. The wheel 48 carries a substantially radially extending lever 49 which can be said to constitute a follower serving to track the inclined cam face 60 of a projection 56 which is pivotably installed in the housing of the copying machine 1. The casing 7a further accommodates a resilient element in the form of a coil spring 50 which tends to rotate the wheel 42 in a clockwise direction, as viewed in FIG. 2a, and a second resilient element or coil spring 53 which tends to rotate the wheel 52 for the arm 54 in a counterclockwise direction, as viewed in FIG. 2a. The spring 53 is attached to one end of a second flexible element (cable) 51 which is trained over the wheel 52 and the other end of which is attached to the periphery of the wheel 48.

The projection 56 forms part of a signal-responsive operating device 55 for the catcher mechanism in the cassette 7. The purpose of the operating device 55 is to automatically move the arms 40, 41 and 54 of the catcher mechanism to the operative positions shown in FIG. 2a when the cassette 7 is moved to the predetermined position of FIG. 2a, and to automatically effect a movement of the arms 40, 41 and 54 to their inoperative or retracted positions when the attachment of the leader of the web 8 to the core 37 in the cassette 7 is completed, i.e., when the core 37 is capable of drawing photosensitive material into the casing 7a without any assistance from the catcher mechanism.

The projection 56 of the operating device 55 is a pivotable element which constitutes a two-armed lever. One arm of this projection extends outwardly through an opening 58 in the housing of the copying machine 1 and is provided with the aforementioned cam face 60 for the follower lever 49 of the wheel 48. The other arm of the projection 56 constitutes a small protuberance 61 which is urged against a stop 63 in the housing of the copying machine 1 by a resilient element in the form of a coil spring 62. The projection 56 is pivotable on a horizontal pin 57, and its protuberance 61 can be releasably locked in the solid-line position of FIG. 2a (i.e., in a position of abutment with the stop 63) by the armature or locking bolt 64 of a rotary electromagnet 65 in the housing of the copying machine 1. The casing 7a of the cassette 7 has an opening 59 which registers with the opening 58 in the wall 1a of the machine 1 when the cassette 7 is moved to the predetermined position of FIG. 2a. The axis of the pivot 57 is parallel to the axis of the core 37 when the cassette 7 is held in the position of FIG. 2a.

Figure 4:
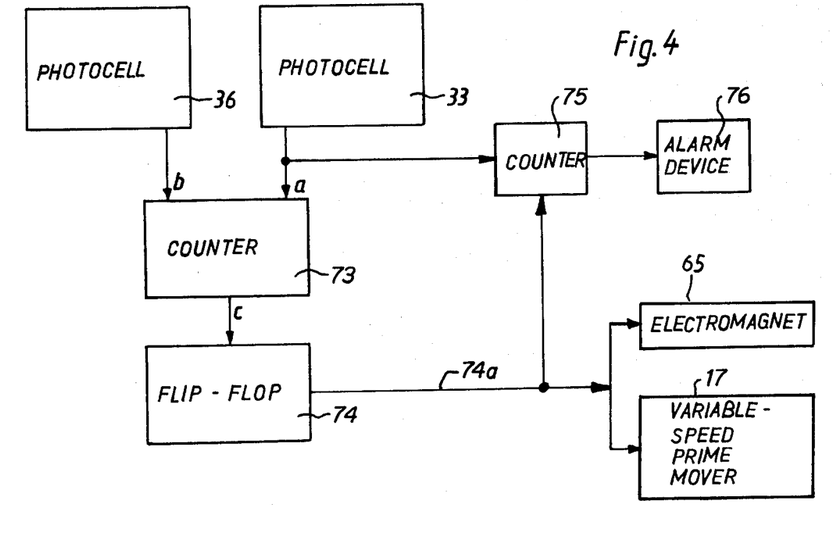
FIG. 4 is a circuit diagram showing the means for varying the speed of the main prime mover of the copying machine and for deactivating the catcher mechanism as soon as the leader of the web is adequately attached to the rotary component in an empty receptacle.

FIG. 4 illustrates a circuit which serves to change the condition of the operating device 55 and includes the photocells 33, 36 in the housing of the copying machine 1. The purpose of the circuit of FIG. 4 is to cause the operating device 55 to deactivate the catcher mechanism in the cassette 7 when the leader of the web 8 is properly engaged by the core 37. The transducers of the photocells 33 and 36 transmit signals to the corresponding inputs a and b of a signal generating circuit 73 whose output c transmits signals to a flip-flop 74 having an output which is connected with the rotary electromagnet 65 and with the variable-speed prime mover 17 of the copying machine 1.

The parts 32, 33 can be said to constitute a means for monitoring the peripheral speed of the rotary component or rotor 26, and the parts 35, 36 can be said to constitute a means for monitoring the peripheral speed of the rotary component or core 37 in the casing 7a of the cassette 7. The output c of the circuit 73 generates signals for transmission to the electromagnet 65 and to the prime mover 17 when the ratio of peripheral speeds of the rotor 26 and core 37 is outside of a predetermined range, preferably when the peripheral speed of the rotor 26 begins to equal or closely approximate the peripheral speed of the core 37.

The mode of operation of the apparatus which is shown in FIGS. 1, 2, 2a and 4 is as follows:

When no cassette is adjacent to the wall 1a of the housing of the copying machine 1, the projection 56 of the operating device 55 is held in the solid-line position of FIG. 2a. The projection 56 is urged to such position (of abutment with the stop 63) by the coil spring 62 and is releasably locked in such position by the armature 64 of the electromagnet 65. If the operator (or an automatic feeder) delivers an empty cassette 7 to the predetermined position of FIG. 2a, the left-hand arm of the projection 56 enters the casing 7a via opening 59 and its cam face 60 pivots the follower lever 49 counterclockwise from the broken-line position to the solid-line position of FIG. 2a. This causes the wheel 48 to move the cables 46 and 51 lengthwise against the opposition of the respective coil springs 50 and 53 so that the arms 40 and 41 of the catcher mechanism are moved to the illustrated (operative) positions and the third arm 54 also assumes the operative position of FIG. 2a. This ensures that, when the web 8 is caused to advance lengthwise, its leader advances in the channel which is defined by the parts 40, 41a and 54 and moves into frictional engagement with the peripheral surface of the core 37. The wheels 42 and 43 rotate counterclockwise, as viewed in FIG. 2a, while the respective arms 40 and 41 move toward their operative positions, and the wheel 52 then rotates in a clockwise direction.

The operator or some automatic device selects the desired initial speed of the prime mover 17 of the copying machine 1, and the threading of the leader of the web 8 into the cassette 7 can begin as soon as the casing 7a assumes the predetermined position of FIG. 2a. It is normally preferred to introduce the leader of the web 8 into the casing 7a while the copying machine 1 is operated at a relatively low speed. During introduction of the leader of the web 8 into the casing 7a, the peripheral speed of the core 37 exceeds the peripheral speed of the rotor 26 of the advancing roll 13. The leader enters the channel between the parts 40, 41a and 54 and progresses toward the core 37 which rotates and comes into requisite frictional engagement with the leader as a result of the action of rollers 44 and 45 which bias the leader against the external surface of the core.

As mentioned above, the peripheral speed of the core 37 exceeds the peripheral speed of the rotor 26 during introduction of the leader of the web 8 into the casing 7a. Once the leader of the web 8 adheres to the core 37 with a force which suffices to ensure that the core 37 can draw the web into the cassette 7, the core 37 continues to rotate at the same peripheral speed as in the course of the catching operation but the peripheral speed of the rotor 26 increases. This is possible because of the interposition of freewheel 27 between the rotor 26 and the shaft 28. In other words, the peripheral speed of the rotor 26 then exceeds that (given) speed at which the rotor would be driven were it to derive motion from the motor 17 via belt 19, pulley 15, belt 18, friction disc 13a and shaft 28. It will be noted that, once the leader of the web 8 is adequately attached to and the web is pulled by the core 37 in the casing 7a of the cassette 7, the peripheral speed of the rotor 26 matches or closely approximates that of the core 37. This is ascertained by the signal generating circuit 73 of FIG. 4. The output c of the circuit 73 then transmits a signal to the flip-flop 74 which sets the prime mover 17 of the copying machine 1 for operation at a higher speed (since the leader of the web 8 is properly attached to the core 37) and which changes the condition of the rotary electromagnet 65 so that the latter disengages its armature 64 from the protuberance 61 of the projection 56 whereby the projection 56 assumes the broken-line position of FIG. 2a because the bias of the springs 50 and 53 exceeds the bias of the spring 62. In other words, the protuberance 61 moves away from the stop 63 in the housing of the copying machine 1 and the wheel 48 in the casing 7a can turn in a clockwise direction, as viewed in FIG. 2a, to enable the cable 51 to return the arm 54 to its inoperative position via wheel 52. At the same time, the cable 46 causes the wheels 42 and 43 to retract the respective arms 40 and 41 to their inoperative positions and to thus provide around the core 37 ample room for reception and convolution of a substantial length of the web 8.

Figure 3:
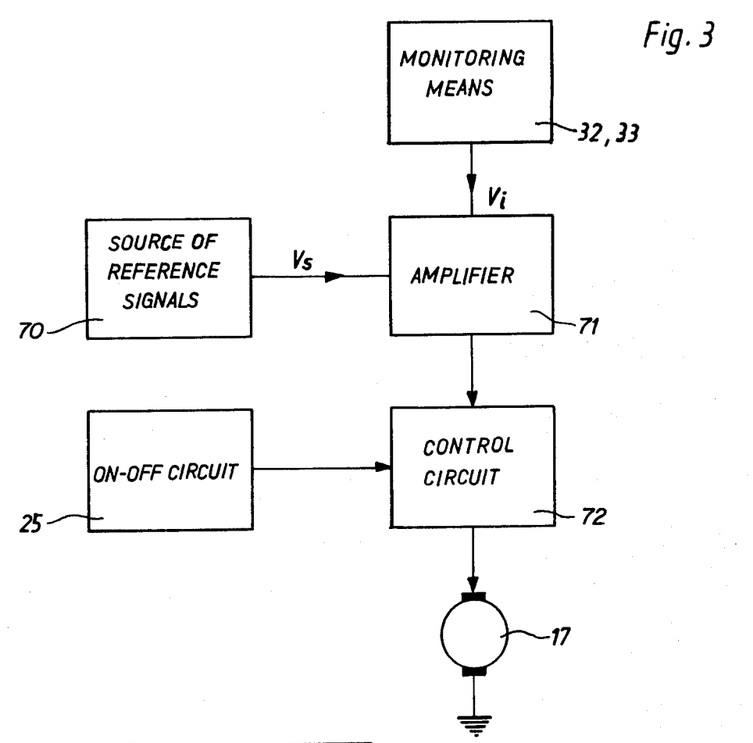
FIG. 3 is a circuit diagram of the means for regulating the speed of the motor which transmits torque to the two rotary components.

FIG. 3 illustrates a circuit which regulates the speed of the motor 17 in response to signals which are generated by the transducer of the photocell 33 to thereby regulate the speed at which the core 37 in the cassette 7 convolutes the web 8 therearound. The prime mover 17 of the copying machine 1 can be driven at least at two different speeds, e.g., a lower speed which is desirable for advancing the leader of a web 8 into the range of the core 37, and a second or normal speed at which the web 8 is transported subsequent to attachment of its leader to the core 37, i.e., after the core 37 begins to draw the web from the copying machine 1 while the copying machine exposes successive frames of the photosensitive material to light at the desired intervals. A knob or the like can be provided to select the lower speed of the prime mover 17 of the copying machine 1, i.e., to select the lower speed preparatory to activation of the catcher mechanism.

The reference character 70 denotes in FIG. 3 a source of reference signals Vs which are indicative of the desired speed of the rotor 26. The source 70 transmits signals Vs to one input of a signal comparing amplifier 71 another input of which receives signals from the transducer of the photocell 33 forming part of the means 32, 33 for monitoring the peripheral speed Vi of the rotary component 26. The output of the amplifier 71 is connected with one input of a motor control circuit 72 which can regulate the speed of the motor 17. The motor control circuit 72 has a second input which is connected with the output of the aforementioned on-off circuit 25 serving to start or arrest the motor 17 in dependency on the quantity of flexible material which is stored in the magazine 3 of the copying machine 1. The elements 71 and 72 of the circuit shown in FIG. 3 can be said to constitute a means for varying the speed of the motor 17 when the actual peripheral speed Vi of the rotor 26 deviates from the desired speed Vs. The character Vk (FIG. 2) denotes the peripheral speed of the core 37.

It is now assumed that the leader of the web 8 is already engaged by the rotary core 37 in the cassette 7, i.e., that the core 37 draws the web 8 from the housing of the copying machine 1. The web 8 is convoluted onto the core 37 at intervals which are determined by the photocells 10 and 11, i.e., in response to signals transmitted by the output of on-off circuit 25. As mentioned above, the circuit 25 arrests the motor 17 when the transducer of the photocell 11 transmits a signal, and the motor 17 is started again when the supply of web 8 in the magazine 3 of the copying machine 1 is replenished to an extent which is necessary to interrupt the light beam between the light source and the transducer of the photocell 10.

When the web 8 is in motion, it is drawn by the core 37 in the direction indicated by arrow 39 (FIG. 2) whereby the monitoring means 32, 33 generates a signal Vi which is indicative of the peripheral speed of the rotor 26. Such signal Vi is compared with the reference signal Vs which is supplied by the source 70, i.e., the amplifier 71 can be said to constitute or to include a signal comparing stage whose output transmits to the control circuit 72 a signal when the actual speed of the rotor 26 (as denoted by the signal Vi) deviates from the speed denoted by the signal Vs. When Vs equals Vi, the speed of the motor 17 remains unchanged. As the diameter of convoluted photosensitive material on the core 37 in the cassette 7 increases, the quantity of photosensitive material which advances through the nip of the advancing rolls 13, 14 per unit of time also increases, i.e., the peripheral speed of the rotor 26 of the advancing roll 13 increases to increase the intensity or another characteristic of the signal Vi which is transmitted by the output of the transducer of the photocell 33. The amplifier 71 then reduces the speed of the motor 17 through the medium of the control circuit 72 so that the intensity of the signal Vi is reduced and again matches that of the reference signal Vs.

As stated above, the circuit which generates signals denoting that the leader of the web 8 is properly engaged with the core 37 in the cassette 7 which is held in the predetermined position of FIG. 1 or FIG. 2a is illustrated in FIG. 4. Such circuit comprises the aforementioned signal generating device 73 which can constitute a conventional up/down counter whose inputs a and b are respectively connected with the outputs (transducers) of the photocells 33 and 36, i.e., such inputs receive signals at frequencies respectively denoting the peripheral speeds of the rotor 26 and core 37. The frequency at which the input b of the counter 73 receives signals is further indicative of the RPM of the motor 17 which drives the core 37 through the medium of parts 19, 15, 20, 21, 22, 24 and 24a. The output c of the counter 73 is connected with the simple signal receiving switching element or flip-flop 74.

The transducer of the photocell 33 further transmits signals to a second counter 75 which counts the number of such signals and whose output is connected with the input of an alarm device or defect signal generator (e.g., a whistle, a bell, a light source or the like) which generates a visible, audible and/or otherwise detectable alarm signal when the number of signals which the transducer of the photocell 33 transmits to the counter 75 (prior to resetting of the counter 75 to zero by a signal from the flip-flop 74, i.e., prior to generation of a signal which denotes that the leader of the web 8 is properly attached to the core 37 in the cassette 7) reaches a preselected value.

The counter 73 can be replaced with any one of a variety of known signal comparing and signal generating devices which are capable of generating signals when the ratio of speeds denoted by the signals from the photocells 33 and 36 is outside of a predetermined range.

To recapitulate, the operation of the improved apparatus, with reference to FIGS. 1 to 4, is as follows:

After a fresh (empty) cassette 7 has been moved to its predetermined position with reference to the housing of the copying machine 1, the apparatus automatically initiates the attachment of the leader of a web 8 to the core 37 in such cassette in a manner as already described above. At such time, the speed of the prime mover 17 of the copying machine 1 is the lower or lowest of two or more speeds. As also mentioned above, the peripheral speed of the core 37 (which is driven by the motor 17 via unit 6) during advancement of the leader of the web 8 from the nip of the advancing rolls 13, 14 toward the core 37 of the properly positioned cassette 7 is higher than the peripheral speed of the rotor 26. By appropriate selection of the ratio of diameters of the star wheels 32, 35 and of the transmission ratio of the parts shown in FIG. 2, one can readily operate the monitoring means 32, 33 and 35, 36 in such a way that the number of (second) signals generated by the transducer of the photocell 33 per unit of time matches the number of (third) signals which are generated by the photocell 36 during the same interval of time, even though the peripheral speeds of the rotor 26 and core 37 are different. The counter 73 totals the number of second signals which are generated by the transducer of the photocell 33 and deducts from the total the number of third signals which are transmitted by the transducer of the photocell 36. In other words, while the leader of the web 8 advances toward the core 37 and the peripheral speed of the core 37 exceeds the peripheral speed of the rotor 26, the number of signals which are stored in the counter 73 is zero or such number does not change because the transducer of the photocell 36 generates a signal for each signal which is generated by the transducer of the photocell 33.

Once the leader of the web 8 is properly attached to the core 37 so that the latter can draw the web from the housing of the copying machine 1, the peripheral speed of the rotor 26 increases because the rotor then receives torque from the running web 8 rather than from the motor 17 via freewheel 27. In other words, the rotor 26 begins to rotate with reference to, rather than in response to rotation of, the shaft 28. This increases the peripheral speed of the star wheel 32 so that the transducer of the photocell 33 begins to transmit signals at a higher frequency, i.e., the number of (second) signals which the input a of the counter 73 receives per second exceeds the number of (third) signals which are received by the input b of the counter 73 during the same interval of time. Consequently, the number of signals which the counter 73 stores is on the increase and, when such number reaches a preselected value, the output c of the counter 73 transmits a signal to the flip-flop 74 which, in turn, transmits a signal (via conductor means 74a shown in FIG. 4) serving to deactivate the catcher mechanism which assists the leader of the web 8 in finding its way into the range of the rotating core 37 in the casing 7a of the cassette 7.

The signal which is transmitted via conductor means 74a can also be used for other purposes. At the present time, the primary purpose of such signal is to deactivate the catcher mechanism for the leader of the web 8 by deenergizing the electromagnet 65 of the operating device 55, i.e., to furnish an indication as to the progress of engagement between the leader of the web 8 and the core 37 of a fresh cassette 7. An additional function or purpose of the signal which appears at the output of the flip-flop 74 is to reset the second counter 75 to zero, i.e., to prevent the counter 45 from transmitting an additional signal to the defect signal generator or alarm device 76. The setting of the counter 75 is such that its output does not transmit a signal if the attachment of the leader of the web 8 to the core 37 in a fresh cassette 7 has been completed within an anticipated interval of time, i.e., within a period of time which, based on experience, should be amply sufficient to allow for adequate engagement between the leader and the core 37. However, if such interval is exceeded, i.e., if the total number of signals which the input of the counter 75 receives from the transducer of the photocell 33 exceeds the preselected value before the counter 75 is reset to zero in response to a signal from the flip-flop 74, the output of the counter 75 transmits an additional signal which results in actuation of the alarm device 76, i.e., the attendant or attendants are warned that the threading of the leader of the web 8 into the cassette 7 is not progressing in the anticipated way. As a rule, the counter 75 will fail to transmit a signal to the alarm device 76 because it is reset to zero by a signal from the flip-flop 74 ahead of the time when the counter 75 accumulates a requisite (preselected) number of signals (from the transducer of the photocell 33) to trigger the operation of the alarm device 76.

Still further, and as also explained above, the signal at the output of the flip-flop 74 can be used to increase the speed of the prime mover 17 of the copying machine 1. This can be seen in FIG. 4 wherein the output of the flip-flop 74 is connected with the variable-speed prime mover 17 as well as with the electromagnet 65 of the operating device 55. The prime mover 17 is the variable speed motor of the copying machine, and the operating device 55 is a means for deactivating the catcher mechanism in and/or on the cassette 7 in response to completion of attachment of the leader of the web 8 to the core 37 in such cassette.

Figure 5:
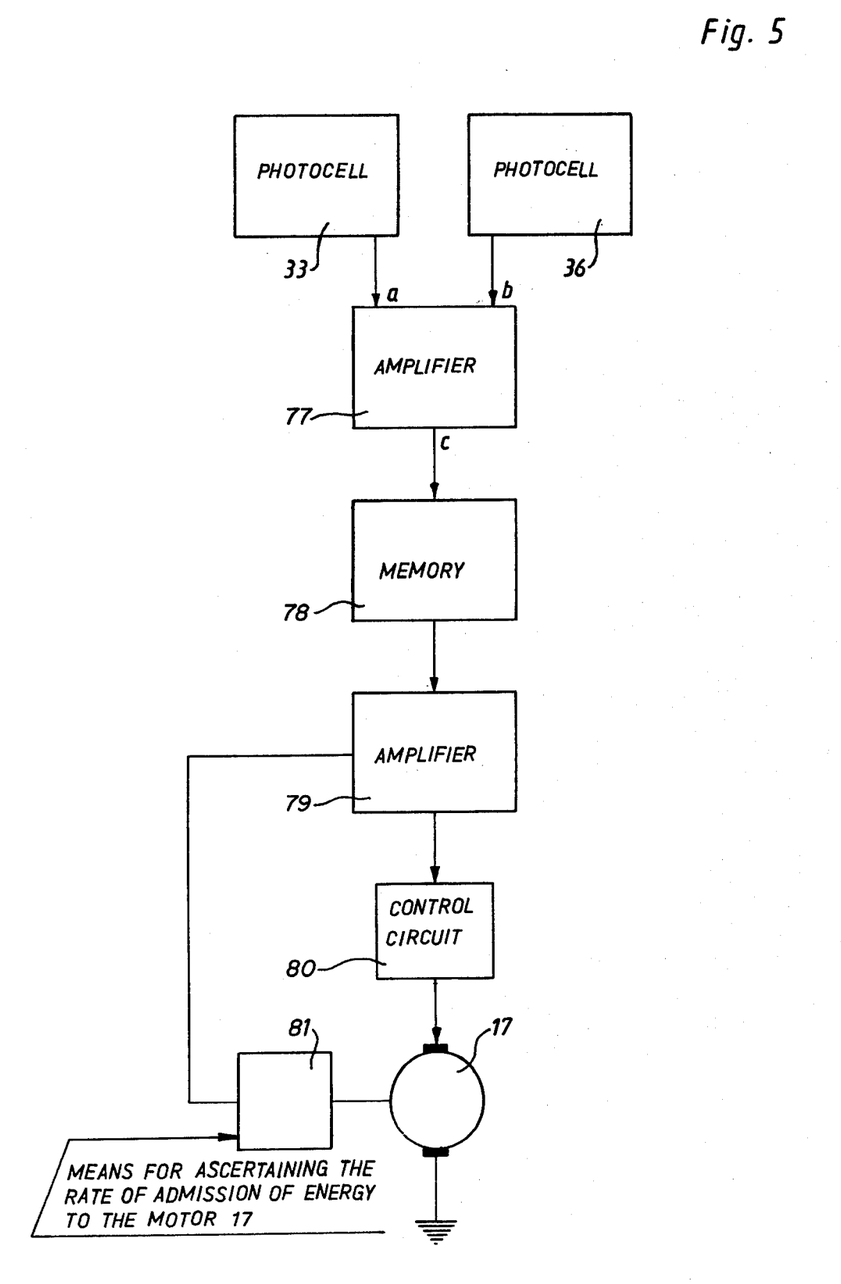
FIG. 5 is a circuit diagram showing the means for varying the torque of the motor in response to increasing diameter of the material which is convoluted onto the rotary component in the receptacle.

The signals which are generated by the transducers of the photocells 33 and 36, i.e., the signals which denote the peripheral speeds of the rotor 26 and core 37, can also be used to regulate the torque of the variable-speed electric motor 17. This is shown in FIG. 5 wherein the transducers of the photocells 33 and 36 are connected with the corresponding inputs a and b of a signal comparing stage here shown as a differential amplifier 77 which processes such signals and generates a signal which is indicative of the difference between the peripheral speeds of the rotor 26 and core 37 when such difference reaches a predetermined value. The output c of the amplifier 77 is connected with the input of a memory 78 whose output is connected, in turn, with one input of an operational amplifier 79. The output of the amplifier 79 connected with the final stage of a control circuit 80 for the motor 17 which latter is connected with a second input of the amplifier 79 by way of a current sensor 81 serving to ascertain the rate of admission of electrical energy to the motor 17.

The operation of the circuit which is shown in FIG. 5 is not affected if the differential amplifier 77 is preceded by a counter which receives and transmits digital signals, or if the amplifier 77 is designed to receive and transmit analog signals, i.e., if the signals which are transmitted by the transducers of the photocells 33 and 36 are converted into analog signals prior to reaching the corresponding inputs a and b of the differential amplifier 77. All that counts is to ensure that the signal at the output c of the amplifier 77 be indicative of a predetermined difference between the peripheral speeds of the rotor 26 and core 37. The elements 77 to 81 of the circuit shown in FIG. 5 influence the motor 17 when the difference between the peripheral speeds of the rotor 26 and core 37 reaches a predetermined value. The elements 79 to 81 can be said to constitute a means for influencing the supply of electrical energy to the motor 17 in dependency on the characteristics of signals at the output of the memory 78.

As explained in connection with FIG. 3, the speed of the motor 17 is reduced in response to increasing diameter of the material which is convoluted onto the core 37 in the cassette 7 because this entails an increase in the peripheral speed of the rotor 26 which, in turn, entails a reduction of the RPM of the motor 17. The purpose of the circuit which is shown in FIG. 3 is to ensure that the web 8 is advanced at a substantially constant speed during movement through the nip of the advancing rolls 13 and 14. This means that the difference between the peripheral speeds Vi (rotor 26) and Vk (core 37) continues to increase. The peripheral speed Vi should remain constant. The torque which is transmitted by the motor 17 should increase with increasing diameter of the material which is convoluted on the core 37. In other words, the torque which is transmitted by the motor 17 should be relatively small when the coiling operation begins (in order to avoid excessive stressing of the web 8), but such torque can increase when the diameter of convoluted material on the core 37 increases. To this end, the differential amplifier 77 of FIG. 5 transmits a signal which is indicative of the difference between the speeds Vi and Vk. Such signal is stored in the memory 78 and is transmitted to the operational amplifier 79. The latter compares the signal from the memory 78 with the signal from the circuit 81 so that the control circuit 80 increases the supply of electrical energy to the motor 17 with increasing difference between the speeds Vi and Vk.

When the coiling operation begins, the difference between the speeds Vi and Vk is zero or close to zero (at any rate, such difference is relatively small). Therefore, the control circuit 80 then supplies the motor 17 with a minimal amount of electrical energy. Since the web 8 is transported stepwise (note the circuit 25), the comparison of speeds Vi and Vk would have to be resumed after each starting of the core 37, i.e., each starting of the core 37 would take place while the motor 17 receives a minimal amount of energy. This would adversely affect the quality of the supply of flexible material which accumulates on the core 37. Such mode of operation is avoided by the provision of the memory 78 whose output transmits to the amplifier 79 the last stored signal, i.e., a signal denoting the ratio of speeds Vi and Vk prior to last stoppage of the web 8 in response to a signal from the circuit 25. The intensity or another characteristic of the signal which is stored in the memory 78 is changed only when the input of the memory 78 receives a different signal from the amplifier 77.

The circuits which are shown in FIGS. 3, 4 and 5 can be installed in one and the same copying machine. Moreover, such circuits can be consolidated in a computer whose output transmits signals to the motor 17, to the alarm device 76 and to the electromagnet 65 of the operating device 55, and whose inputs are connected with the transducers of the photocells 33, 36 or with the outputs of other suitable means for monitoring the peripheral speeds of the rotor 26 and core 37.

An important advantage of the improved apparatus is that it can generate signals (to the prime mover 17 and electromagnet 65 of the operating device 55) which are truly indicative of the progress of attachment of the leader of a web 8 to the core 37 in a cassette or an analogous receptacle for convoluted photosensitive material. The apparatus and its circuitry are relatively simple and reliable. Furthermore, the apparatus can regulate the speed and torque of the motor 17 in an equally simple and reliable manner.

Another important advantage of the improved apparatus is that the customary friction clutch (such as is disclosed in German Offenlegungsschrift No. 26 17 233) can be replaced with a much more satisfactory device (freewheel 27). In the apparatus of the Offenlegungsschrift, the means for rotating the core in the cassette is directly coupled with the drive for the advancing rolls in the copying machine. This renders it necessary to equip each and every cassette with a friction clutch which is needed because the speed of the web which issues from the copying machine is at least substantially constant whereas the speed of the web in the region of the core in the cassette tends to increase with increasing diameter of the convoluted material. Heretofore known attempts to overcome such drawbacks of conventional apparatus include the utilization of mechanical sensors which monitor the diameter of convoluted material on the core and reduce the RPM of the motor for the core accordingly. As explained above, such regulation of the speed of the motor can be carried out in the improved apparatus by the simple expedient of generating signals which are indicative of differences between the peripheral speeds of the core 37 and rotor 26 and of comparing such signals with the reference signal from the source 70 shown in FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting a web of flexible material, particularly for transporting a web of photosensitive material from a copying machine into a receptacle which stores the web in the form of convolutions, comprising first web advancing means including a web-contacting first rotary component; second web advancing means including a second rotary web-engaging component; motor means for driving said components; freewheel means interposed between said motor means and said first component so that the latter can be rotated by said motor means to advance the web and by the web when the latter is advanced by said second advancing means and the peripheral speed of said second component exceeds a given peripheral speed at which said first component can be driven by said motor means; first and second monitoring means for respectively monitoring the peripheral speeds of said first and second components; and means for generating signals when the ratio of monitored peripheral speeds of said components is outside of a predetermined range.

2. The apparatus of claim 1 for transporting the web into a receptacle having a rotary core which constitutes said second component and whose peripheral speed exceeds said given speed while said second component is driven by said motor means so that, once the web engages and is convoluted onto said second component to impart torque to said first component, the peripheral speed of said first component rises above said given speed at least approximates the speed of said second component, said signal generating means being arranged to generate signals when the speed of the first component at least approximates the speed of the second component.

3. The apparatus of claim 1, wherein said first advancing means comprises two advancing rolls and said first component includes one of said advancing rolls.

4. The apparatus of claim 1, wherein at least one of said monitoring means comprises a slotted rotary member arranged to rotate in synchronism with the respective rotary component, and a photocell cooperating with the rotary member.

5. The apparatus of claim 1, wherein said first and second monitoring means are respectively arranged to transmit second and third signals at frequencies which are indicative of the peripheral speeds of the respective rotary components, said signal generating means comprising an up/down counter having first and second inputs respectively connected with said first and second monitoring mean, and said counter being arranged to totalize said second signals and subtract from the total said third signals as well as to generate said first mentioned signals when the total of second signals minus the third signals matches a preselected value.

6. The apparatus of claim 5, wherein said counter has output means for said first mentioned signals; and further comprising means for receiving signals from the output means of said counter.

7. The apparatus of claim 6, wherein said signal receiving means includes a flip-flop.

8. The apparatus of claim 1, wherein said first monitoring means includes means for transmitting second signals at a frequency which is indicative of the peripheral speed of said first rotary component; and further comprising counter means connected with said first monitoring means and arranged to generate an additional signal in response to reception of a predetermined number of second signals.

9. The apparatus of claim 8, wherein said counter means has output means for said additional signals; and further comprising an alarm device connected with said output means and actuatable by said additional signals.

10. The apparatus of claim 1, wherein said motor means includes an electric motor and said first and second monitoring means respectively comprise means for generating second and third signals indicative of peripheral speeds of the respective rotary components; and further comprising means for influencing said motor when the difference between the peripheral speeds of said components reaches a predetermined value.

11. The apparatus of claim 10, wherein said influencing means comprises a signal comparing stage having first and second inputs respectively connected with said first and second monitoring means and output means for transmission of fourth signals when the difference between the speeds of said components reaches said predetermined value.

12. The apparatus of claim 11, wherein said influencing means further comprises means for regulating the supply of electrical energy to said motor in response to said fourth signals.

13. The apparatus of claim 12, wherein said regulating means comprises operational amplifier means interposed between said motor and the output means of said stage.

14. The apparatus of claim 13, wherein said regulating means further comprises means for ascertaining the rate of admission of energy to said motor and for transmitting corresponding signals to said amplifier means.

15. The apparatus of claim 14, further comprising a memory interposed between said stage and said amplifier and arranged to store said fourth signals.

16. The apparatus of claim 1, wherein said motor means includes a variable-speed motor and said first monitoring means comprises means for generating second signals denoting the peripheral speed of said first rotary component; and further comprising a source of reference signals denoting the desired speed of said first component, and means for varying the speed of said motor when the speed of said first rotary component deviates from said desired speed.

17. The apparatus of claim 16, wherein said motor is a variable-speed electric motor.

18. The apparatus of claim 16, wherein said speed varying means includes a control circuit for said motor, and amplifier means interposed between said control circuit and said first monitoring means.

19. The apparatus of claim 16, wherein said speed varying means includes means for operating said motor at a speed at which the motor drives the first component at said desired speed.

* * * * *

UNITED STATES PATENT AND TRADEMARK OFFICE
CERTIFICATE OF CORRECTION

PATENT NO. : 4,469,291
DATED : September 4, 1984
INVENTOR(S) : Helmut TREIBER et al.

It is certified that error appears in the above-identified patent and that said Letters Patent are hereby corrected as shown below:

Foremost page, [75], after "Eching," insert --Erich Nagel, Anzing,--.
Col. 2, line 22, "thc" should read --the--.
Col. 13, line 21, "75" should read --45--.
Col. 14, line 19, "be" should read --is--.
Col. 16, line 46, "mean" should read --means--.

Signed and Sealed this

Twenty-sixth Day of March 1985

[SEAL]

Attest:

DONALD J. QUIGG

Attesting Officer     Acting Commissioner of Patents and Trademarks